(12) United States Patent
Schwinn et al.

(10) Patent No.: US 7,473,171 B1
(45) Date of Patent: Jan. 6, 2009

(54) MOLDED SPREADER DISK

(75) Inventors: Kevin S. Schwinn, Orion, IL (US);
Craig E. Murray, Rock Island, IL (US);
David V. Dobbins, Chicago, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/881,319

(22) Filed: Jul. 26, 2007

(51) Int. Cl.
*A01F 12/30* (2006.01)
(52) U.S. Cl. ..................................................... 460/111
(58) Field of Classification Search ................ 239/682, 239/681, 655, 650, 661, 663; 460/111, 112
See application file for complete search history.

(56) References Cited

U.S. PATENT DOCUMENTS

| | | | | |
|---|---|---|---|---|
| 2,474,065 A | 6/1949 | Porter | ............................ | 275/8 |
| 3,171,658 A | 3/1965 | Clark | ............................ | 275/15 |
| 4,367,848 A * | 1/1983 | Ehmke et al. | ................ | 239/665 |
| 4,597,531 A | 7/1986 | Kise | ............................ | 239/650 |
| 4,617,942 A | 10/1986 | Garner | ....................... | 130/27 R |
| 4,836,456 A * | 6/1989 | van der Lely | ................ | 239/682 |
| 4,917,652 A * | 4/1990 | Glaubitz et al. | .............. | 460/111 |
| 5,082,186 A | 1/1992 | Bruns | .......................... | 239/682 |
| 5,215,500 A * | 6/1993 | Kirby | ........................... | 460/111 |
| 5,842,648 A | 12/1998 | Havlovitz et al. | ............ | 239/650 |
| 5,976,011 A | 11/1999 | Hartmann | ..................... | 460/111 |
| 6,089,478 A | 7/2000 | Truan et al. | .................. | 239/675 |
| 6,209,808 B1 * | 4/2001 | Anderson | ..................... | 239/682 |
| 6,238,286 B1 | 5/2001 | Aubry et al. | ................. | 460/111 |
| 6,343,986 B1 * | 2/2002 | Hofer | ........................... | 460/111 |
| 6,663,485 B2 * | 12/2003 | Niermann | ..................... | 460/79 |
| 6,715,703 B2 | 4/2004 | Kost et al. | ..................... | 239/687 |
| 6,722,590 B2 | 4/2004 | Kost et al. | ..................... | 239/687 |
| 6,726,131 B2 | 4/2004 | Berner et al. | ................ | 239/681 |
| 6,793,154 B2 | 9/2004 | Kost | .......................... | 239/288.5 |
| 6,893,340 B1 | 5/2005 | Schmidt et al. | .............. | 460/111 |
| 6,945,481 B2 | 9/2005 | Thompson et al. | ........... | 239/663 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A spreader bat disk for a spreader assembly that has a drive linkage operable to rotatably drive attachments thereto, the spreader bat disk being formed or molded as a unitary construction that includes a web portion, preferably of a generally circular configuration, having a top surface and an essentially flat bottom surface, with a plurality of integral radially distributed spreader blades projecting upwardly from the top surface, and which is configured to be operatively connectable to the drive linkage of the spreader assembly to be rotated thereby to spread material provided thereto.

32 Claims, 12 Drawing Sheets

MOLDED SPREADER DISK

TECHNICAL FIELD

This invention relates to mechanisms adapted for spreading material, particularly crop residue that is discharged from the rear output port of a harvester combine, and especially to mechanisms that have utilized dual spinning circular crop residue spreader disk assemblies assembled from separate spreader plates and associated spreader bats, and, more particularly, to the spreader disk assemblies of such mechanisms.

BACKGROUND ART

Typically, as a harvester combine moves forward through a crop such as wheat, the wheat is cut and conveyed upwardly into the combine and into a threshing portion thereof where the grain is separated from the wheat stalks and then conveyed by the combine to a series of sieves where the chaff is blown away from the grain by blasts of air. The grain separated from the chaff is conveyed within the combine to a grain chute, while the crop residue, including the straw stalks and chaff, is typically conveyed or blown rearwardly to be discharged from the combine through a rear output port. In the absence of some mechanism for broadcast spreading the crop residue, it will typically fall into elongated piles or a windrow trailing behind the combine.

In some instances, when the user desires to make further use of the crop residue, distribution of the crop residue in a windrow may be preferred and the user may then bale or otherwise remove the windrowed material from the field. In other instances, the user does not desire to so make use of the crop residue, and discharge of the crop residue in a windrow is not preferred. In such instances, users generally desire that the crop residue be spread in a swath over a field, and be distributed evenly or uniformly over the swath. Uniform distribution is desirable for a number of reasons. Included among such reasons are that uneven crop residue distribution on a field can lead to temperature and moisture gradients detrimental to even growth of future crops on the field, uneven distribution can make it difficult for crops to utilize nutrients, and uneven distribution can impact the effectiveness of agricultural chemicals. In addition, the existence of large discontinuities of spread crop residue can lead to plugging and other functional problems when such discontinuities are encountered by tillage and/or planting equipment.

One method of spreading crop residue being discharged from the rear output port of a harvester combine that has been advantageously employed has been to rotatably mount a pair of circular spreader disk assemblies side-by-side generally beneath the combine's rear crop residue output port. Such spreader disk assemblies typically have been assembled from various component parts, including a spreader plate and a plurality of separate spreader fins or bats of varying configurations which have been installed on the spreader plates to extend upwardly from the top surface of such spreader plate. The spreader fins or bats have typically been flat or straight when used for heavier residue crops, such as corn, or with smaller width grain headers, and curved when used for lighter residue crops, such as cereal grains, or with wider grain headers, and have typically been secured to the spreader plates by various hardware connectors. The assembled spreader disk assembly has then typically been operatively connected to other standard components of a spreader assembly so that, when viewed from above, the left spreader assembly would rotate in a clockwise direction and so that the right spreader plate would counter-rotate counter-clockwise.

To effect such operation, each of the spreader plates has typically been secured to a spreader cone or conical linkage that extends upwardly and axially from the top surface of the spreader plate. Extending further upwardly from the upper end of each such spreader cone or conical linkage has been a drive axle to which the spreader cone has been secured, and fixedly mounted upon the upper end of each drive axle has been an upwardly facing bevel gear. The bevel gear, axle, conical axle linkage, and spreader disk assemblies have been rotatably mounted upon the rearward end of a combine, and positioned side-by-side, and below the combine's crop residue output port.

In operation, the spreader disk assemblies have then been rotatably driven by a generally horizontal drive shaft having a leftward facing and a rightward facing bevel gear mounted thereon, the bevel gears rotating the left spreader disk assembly clockwise as viewed from above and counter-rotating the right spreader disk assembly in a counter-clockwise direction. Such counter-rotation of the left and right spreader disk assemblies has caused the spreader fins or bats to propel the crop residue rearwardly away from the harvester combine and somewhat sidewardly across the swath of the cut.

Such spreader disk assemblies must be lightweight, durable, and dimensionally stable so as to be able to operate consistently in the confined space in which they reside. Consequently, to this point in time, the spreader plates have generally been formed or constructed of aluminum for reasons of weight and flatness control, the spreader cones have been formed or constructed of light weight plastic, and the spreader bats have been formed or constructed of plastic or steel for wear resistance. Because user demands vary regarding spreading requirements, a number of such spreader disk assemblies include spreader plates that provide multiple mounting locations for a variety of spreader bats of varying configurations. By employing different spreader bats and different mounting locations, a user can effect differing spreading patterns. The versatility of such spreader assemblies, however, is tempered by the associated costs of the assemblies and their multiple configurable parts, taking into account not only the materials of such spreader assemblies, but also the varying configurations and quantities of individual components required, as well as the time required for assembly and disassembly. While many combine users appreciate the versatility of such spreader disk assemblies, they continue to seek less costly spreader disk assemblies that will still afford the quality of service that they demand.

SUMMARY OF THE INVENTION

The present invention offers users a cost effective alternative, in terms of both parts costs and time savings, to the known spreader disk assemblies that have included separate spreader cones, spreader plates, and spreader bats, and which have required the investment of user time for configuration and assembly for use, while preserving much of the versatility that could be realized with the pre-existing disk assemblies. In its more basic form, the invention comprises a construction formed or molded as a unitary member that can replace or be employed in lieu of the sundry separate components that were previously required to assemble and use a spreader disk assembly, which construction incorporates into a unitary member at least a spreader plate and associated integral spreader blades or blade elements, and in further optional configurations, a spreader cone or a spreader cone with an associated conical linkage.

Such a unitary member, with a spreader plate and associated integral spreader blades, is hereinafter referred to as a spreader bat disk. The spreader bat disk is formed or molded as a unitary construction to include a web portion, preferably of a generally circular configuration, having a top surface and a bottom surface, with a plurality of radially distributed integral blade or fin projections projecting upwardly from the top surface, and is configured to be securably attachable to a spreader cone or conical axle linkage of a typical spreader assembly when such spreader cone or conical axle linkage is generally centrally aligned with such web portion.

A preferred embodiment of such spreader bat disk, suitable for use with a typical spreader cone construction that has an outwardly directed flange portion, including a plurality of radially spaced outwardly directed flanges extending from the base of the spreader cone with mounting holes through such flanges, has a generally circular central opening therethrough, the diameter of which central opening generally corresponds to the diameter of the base of the spreader cone, and is positionable to rest upon the outwardly directed flanges of the spreader cone such that the central opening of the spreader bat disk and the base of the spreader cone are generally co-extensive and aligned. The web portion includes mounting holes adjacent the central opening alignable with the mounting holes through the outwardly directed flanges of the spreader cone to securably attach the spreader bat disk to the spreader cone construction. A plurality of integral blade or fin-type projections extend upwardly from the top surface of the web portion, on a spreader bat positioning area on the top surface of the web portion, and longitudinally from an inner end near the central opening through the spreader bat disk to an outer end near the outer periphery of the spreader bat disk, to form integral spreader blades for throwing the crop residue.

For purposes of further discussion herein, the surface of the web portion from which the spreader blades project will be referred to as the top surface of such web portion and of the spreader bat disk, even when the spreader bat disk may be oriented in a position in which such top surface may be lower to a ground surface than the opposed, or bottom, surface of the web portion, such as when the spreader bat disk has been turned upside down. Consequently, as will be further discussed hereinafter, the top surface of the spreader bat disk may, at times when the spreader bat disk is installed upside down in a spreader assembly, be positioned such that the top surface of the spreader bat disk faces downwardly towards the ground surface and the bottom surface of the spreader bat disk faces upwardly.

The noted integral spreader blades may be disposed at spaced radial intervals on said spreader bat disk to extend from the inner end to the outer end thereof, generally either along a radial extending through the inner end of a spreader blade, hereinafter sometimes referred to as a blade base radial, or skewed or at some offset to such a blade base radial. As has previously been discussed, spreader disk assemblies are typically employed in pairs. When the integral spreader blades are positioned on the spreader bat disks generally along a radial, the spreader blades may be considered to be positioned in a nominal position, and like spreader bat disks may be employed for both the left and right counter-rotating disk assemblies.

However, the spreader bat disks can also be formed with integral spreader blades positioned thereon to permit or provide aggressive or retarded throw operation. To achieve aggressive throw operation by a spreader bat disk, the integral spreader blades are configured to uniformly extend from the inner end to the outer end at a given radial offset such that, when the spreader bat disk is viewed from above, the outer end of the spreader blade is advanced in the direction of rotation of the spreader bat disk by some amount, such as by several degrees, relative to the blade base radial and to the inner end of the spreader blade. Since a spreader bat disk is typically paired with another counter-rotating spreader bat disk, however, a pair of spreader bat disks will typically differ slightly from one another by having their respective spreader blades complementarily offset from radials due to the counter-rotation of the spreader bat disks. This is because a spreader blade that is positioned in an advanced direction on a spreader bat disk mounted for clockwise rotation of the spreader bat disk will appear to be positioned in a retarded position if that same spreader bat disk is mounted for counter-clockwise rotation. Consequently, the spreader bat disks can be provided in pairs, with one of the spreader bat disks including integral spreader blades offset from the blade base radial in one direction and with the other of the spreader bat disks including integral spreader blades correspondingly offset from the blade base radial in the opposite direction.

In one preferred configuration, then, the pair of spreader bat disks can thus be mounted such that the integral spreader blades are configured to uniformly extend from the inner end to the outer end at given complementary radial offsets such that, when the spreader bat disks are viewed from above, the outer ends of the spreader blades are advanced in the direction of rotation of the spreader disk bats of which they are a part by several degrees relative to the blade base radial and to the inner end of the spreader blade. Such a pair of spreader bat disks are considered to be configured and mounted for what is deemed aggressive throw operation. When two spreader bat disks with spreader blades positioned for aggressive throw operation are mounted to spreader cones for crop residue spreading, operation of the spreader assembly will then typically result in a throw of crop residue that more aggressively projects the crop residue in a sidewardly direction.

By reversing the left and right mountings of such pair of spreader bat disks, that is, by re-mounting the spreader bat disk that had been mounted as the left disk to be a right-mounted disk and re-mounting the spreader bat disk that had been mounted as the right disk to be the left-mounted disk, a retarded throw mounting configuration can be realized in which, when the spreader bat disks are viewed from above, the outer ends of the spreader blades are retarded in the direction of rotation of the spreader disk bat by several degrees relative to the blade base radial and to the inner end of the spreader blade. With such a retarded throw mounting, operation of the spreader assembly will typically result in a throw of crop residue that projects the crop residue in a sidewardly direction less aggressively than would a straight radial spreader blade.

Thus, by employing a single pair of spreader bat disks, one having its integral spreader blades offset from the blade base radial in one direction and the other having its integral spreader blades correspondingly offset from the blade base radial in the opposite direction, either aggressive or retarded throw operation can be realized, depending upon which spreader bat disk is mounted on the left and which is mounted on the right.

Optionally, additional separately installable spreader bats can also be employed with the molded spreader bat disks. To accommodate the additional separately installable spreader bats, the spreader bat disks may include mounting holes at various locations, and such additional spreader bats, which may be of various configurations, can be securably attached to the spreader bat disks, such as by attaching them to the spreader bat disks at the locations of various mounting holes in either the web portion or along the integral spreader blades. One preferred form of additional spreader bats includes a concave blade which can be installed generally adjacent an integral spreader blade on the spreader bat disks, on either side of the integral spreader blade, depending upon the left and right mounting configuration of the spreader bat disk, for either aggressive or retarded throw positioning. Additional mounting holes in the spreader bat disk can also accommodate the installation of the additional spreader bats at middle or neutral positions between the integral spreader blades.

Additional spreader bats of other configurations may also be employed, including, for example, bats of a generally inverted L-shape that may be attached along or to the integral spreader blades so that the web portion, the integral spreader blade to which the additional inverted L-shaped bat is attached, and such inverted L-shaped bat define a scoop or trough along the top surface of the web portion in the direction of rotation of the spreader bat disk.

Such spreader bat disks can also be employed during windrowing operations, especially when the bottom surface of the web portion is essentially flat, to facilitate the rearward flow and distribution of the crop residue behind the combine without undesired spreading across the swath of the crop cut by installing the spreader bat disks upside down relative to the spreader cones. In such instances, the top surfaces of the spreader bat disks and the integral spreader blades projecting therefrom will face downwardly, towards the ground surface, and the generally flat and smooth bottom surfaces of the spreader bat disks will face upwardly towards the crop residue output port and the crop residue being discharged therefrom. The counter-rotating action of the spreader bat disks, when so installed upside down, will tend, due to the relatively smooth bottom surfaces of the spreader bat disks and the lack of spreader bats thereon, to propel the crop residue rearwardly with minimal sidewardly distribution.

Increased cost savings can be further realized by also incorporating the spreader cone with the spreader bat disk into a unitary construction, hereinafter referred to as a spreader cone disk, and still further cost savings can then be realized by further incorporating the conical linkage with such spreader cone disk into a unitary construction, referred to hereinafter as an integral spreader head.

DETAILED DESCRIPTION OF THE INVENTION

Figure 1:
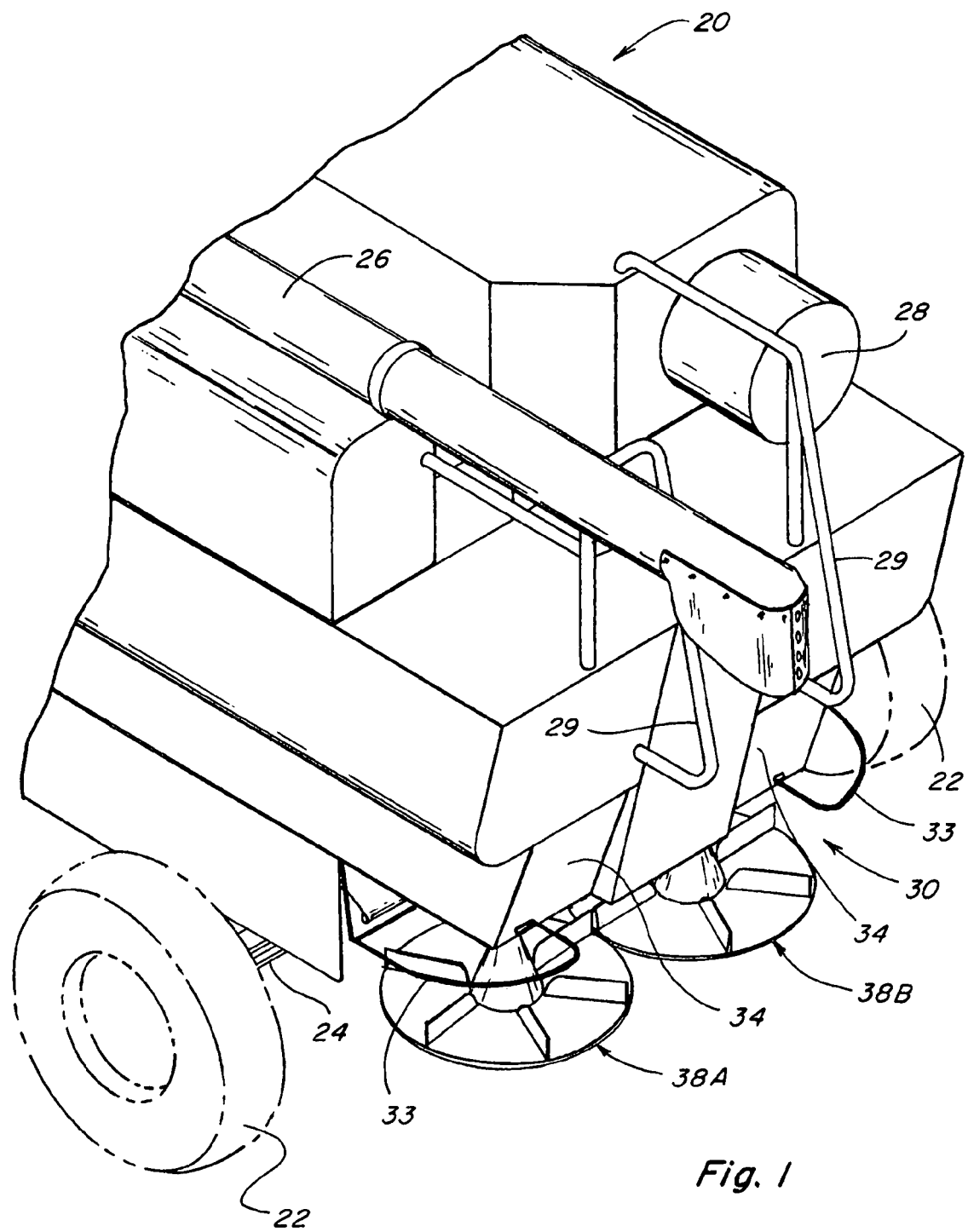
FIG. 1 is a partial perspective view of the rearward end of a typical combine, the combine having installed thereon a spreader assembly including spreader bat disks according to the present invention.
Figure 2:
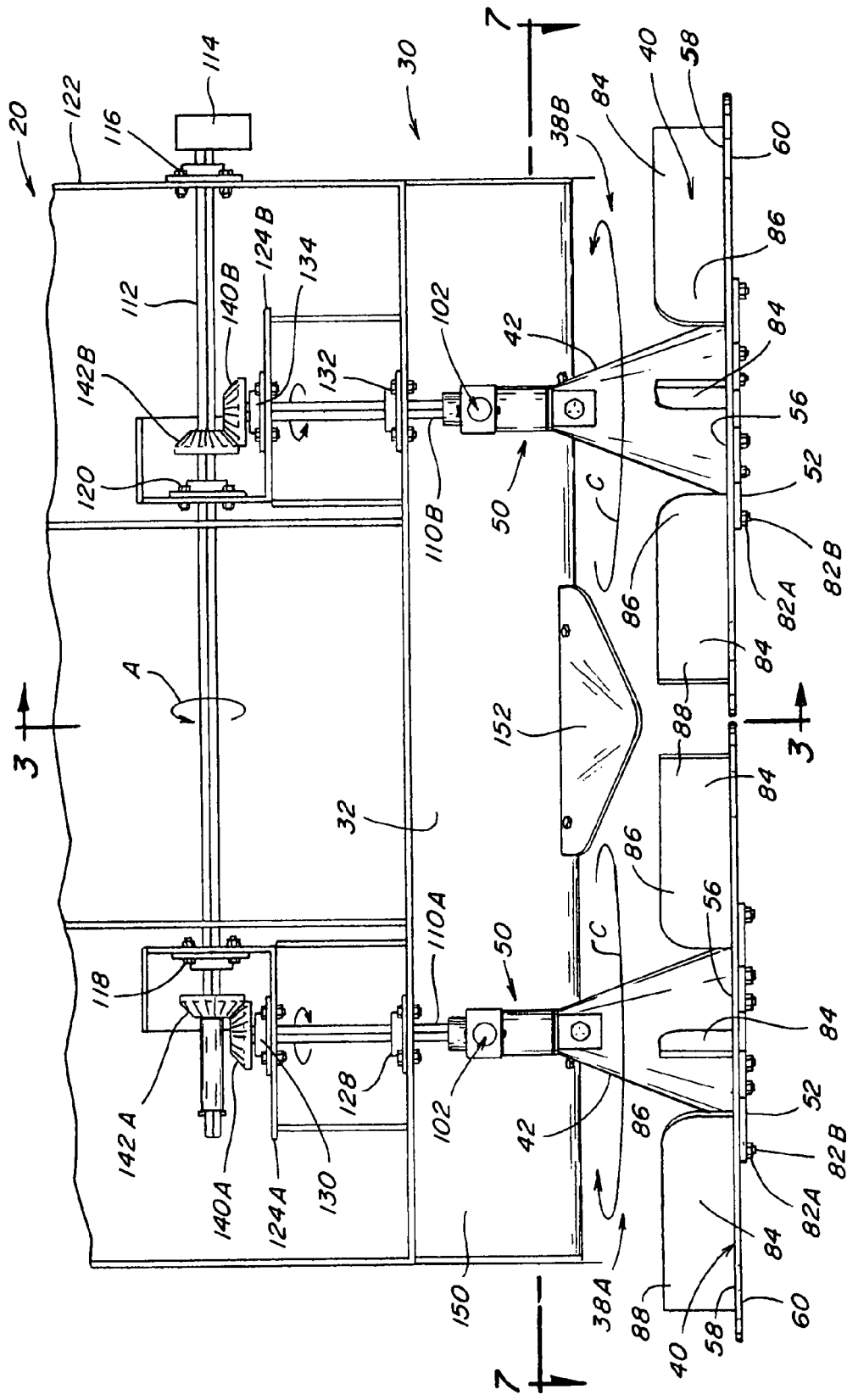
FIG. 2 is a partial rear view of the combine depicted in FIG. 1, with drive linkage cover plates removed.
Figure 3:
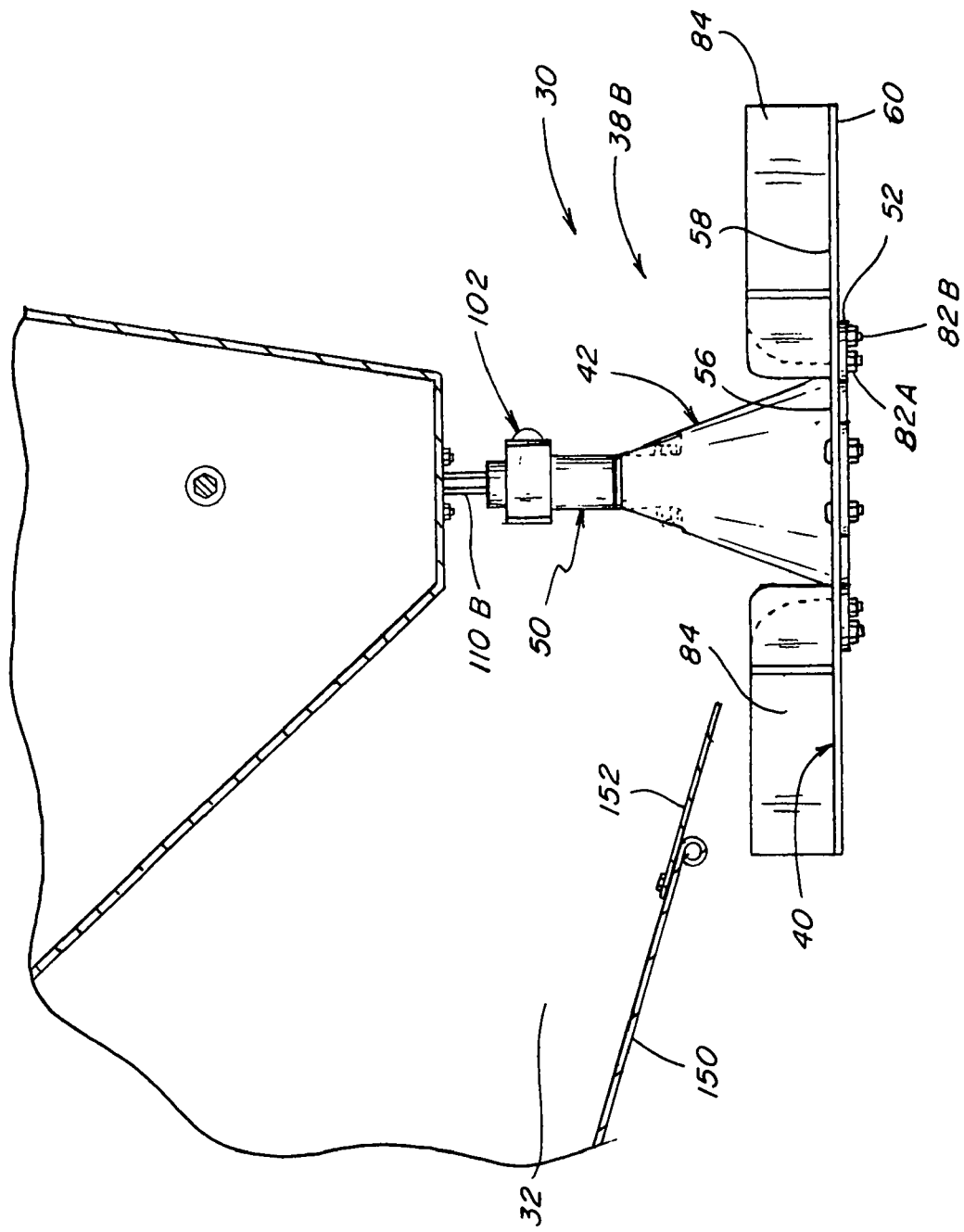
FIG. 3 is a sectional view of the right side of the spreader assembly taken along cut 3-3 of FIG. 2.

Referring now to the drawings, wherein like numerals refer to generally like items and wherein certain numerals are applied on a representational basis to selected, representative items of a class of like items instead of to all of the depicted like items, FIG. 1 depicts the rear portion of a typical combine 20 having a pair of rear tires 22 mounted upon a rear axle 24, with a grain auger or threshing rotor 26, an engine radiator air screen 28, and handrails 29 mounted upon the upper structure of the combine 20. A spreader assembly 30, as better shown in FIGS. 2 and 3, is mounted generally below a crop residue discharge chute 32 (FIG. 3). For safety and other purposes, guard bars 33 (FIG. 1) are mounted extending generally over and across certain more exposed portions of the spreader assembly 30 and removable drive linkage cover plates 34 enclose associated drive linkages. When the threshing rotor 26 is operating, crop residue from such operation is discharged into discharge chute 32 which channels and directs the crop residue flow towards a pair of preferred spreader head assemblies 38A and 38B mounted side-by-side to one another.

Figure 4:
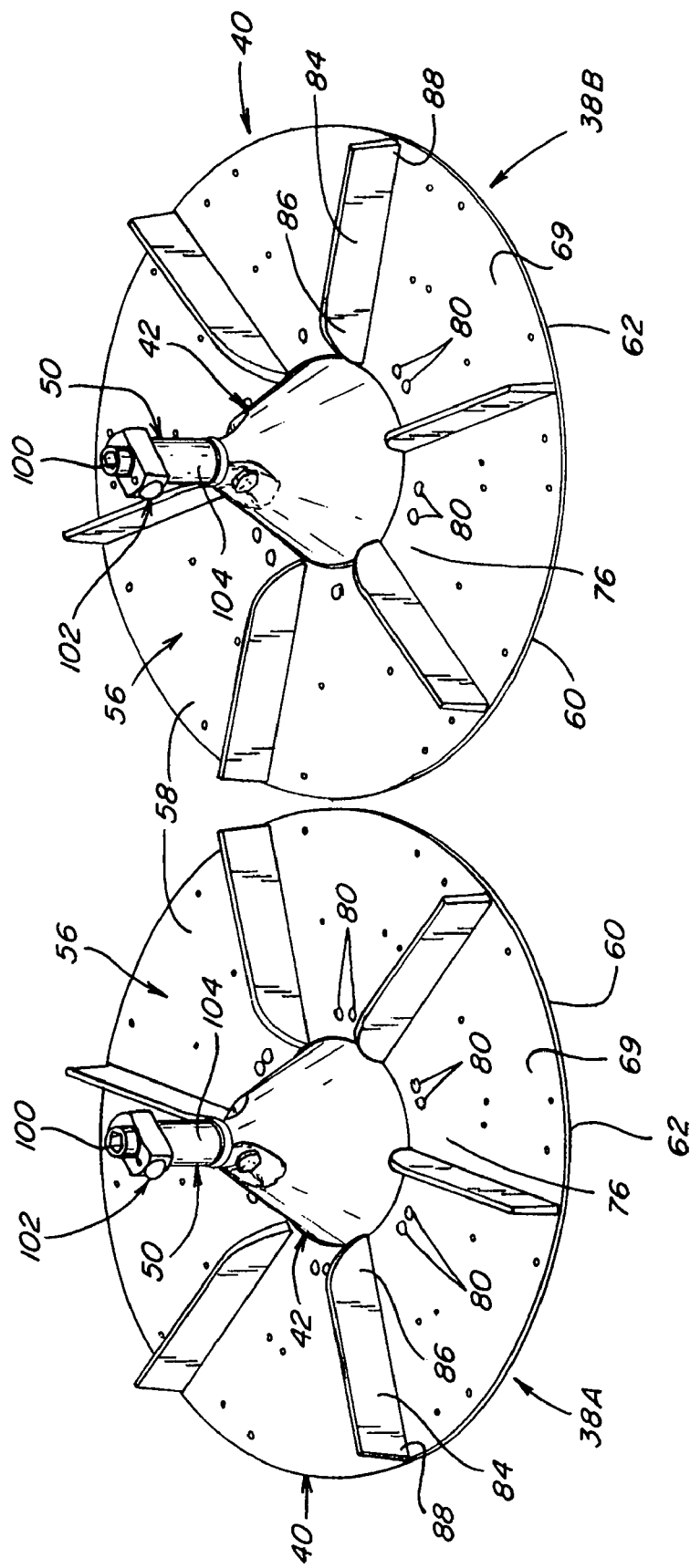
FIG. 4 is a perspective view of the pair of spreader bat disks of FIG. 2.
Figure 5:
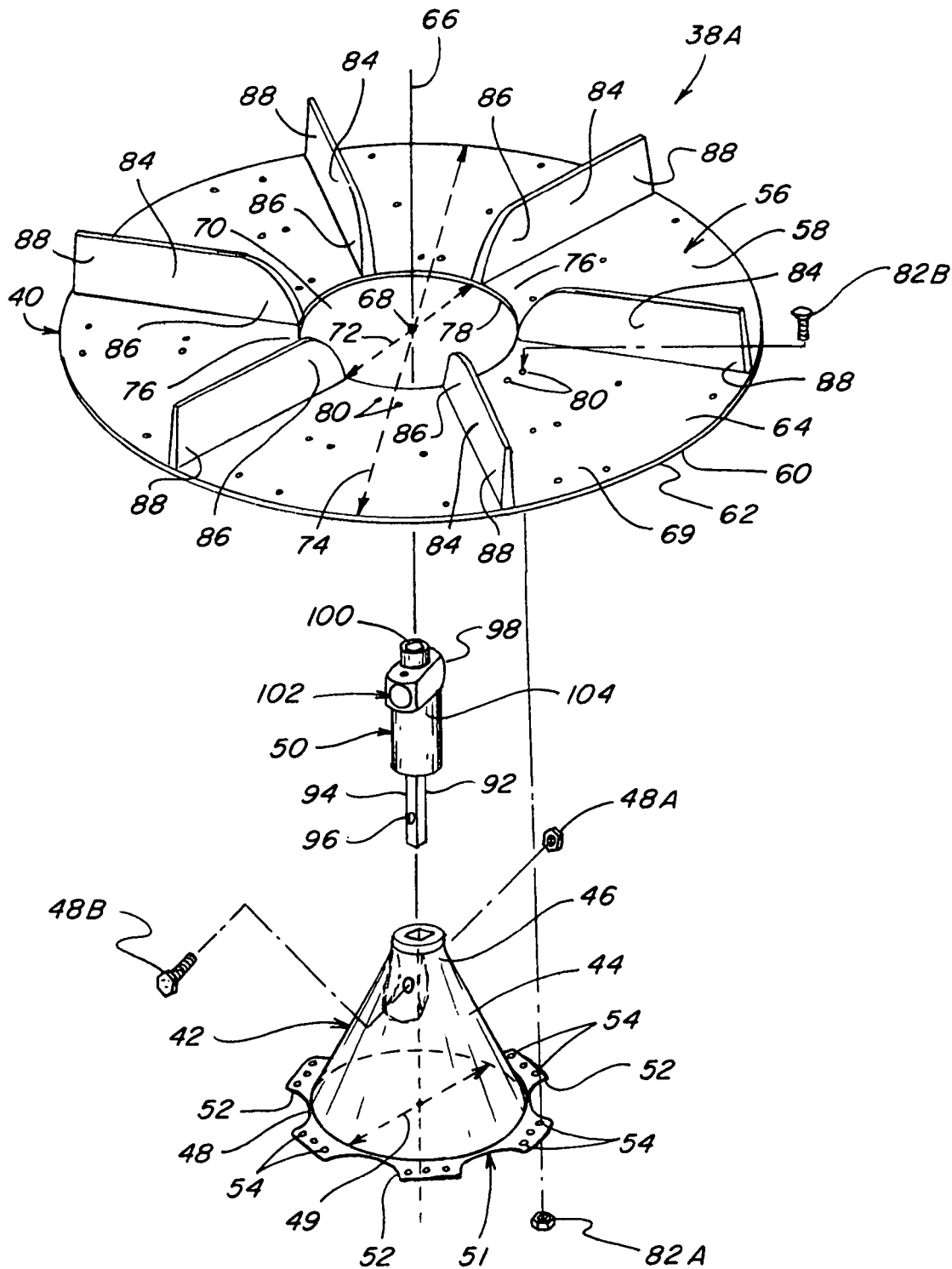
FIG. 5 is an exploded perspective view of a preferred spreader header assembly including a preferred spreader bat disk according to the present invention.

As better shown in FIGS. 4 and 5, the spreader head assemblies 38A and 38B each include a spreader bat disk 40 and a spreader cone 42 to which the spreader bat disk 40 may be joined or secured. Except as will be addressed further hereinafter, the spreader bat disks 40 for the spreader head assemblies may be considered generally similar to one another. The spreader cone 42 so depicted is of a well known construction and includes a cone portion 44 having a cone top 46 and a base 48 having a diameter 49, with cone top 46 connected to a conical axle linkage 50, which is also of well known construction. Cone portion 44 includes an outwardly directed flange portion 51 including a plurality of radially spaced flanges 52 extending from the base 48 thereof, with mounting holes 54 through such flanges 52.

The spreader bat disk 40 is a unitary molded or cast member, preferably formed from a strong but lightweight plastic material that is durable and impact resistant, although it may also be formed from other moldable or castable materials, including fiberglass, metals and metal alloys, ceramics, carbon fiber materials, or other suitable materials, as will be further addressed hereinafter. Spreader bat disk 40 includes a circular web portion 56 with a top surface 58, a bottom surface 60, and a generally circular outer periphery 62. The outer periphery 62 defines a spreader disk circle 64 which has a perpendicular axis of rotation 66 through the center 68 thereof, which axis of rotation may hereafter be referred to as the spreader disk rotation axis or, more simply, the rotation axis. Spreader bat disk 40 includes an outer portion 69 generally adjacent the outer periphery 62 and a generally circular central opening 70, the diameter 72 of which opening 70 corresponds generally to the diameter 49 of the base 48 of spreader cone 42 and is smaller than the diameter 74 of the spreader disk circle 64. An inner ring portion 76 is disposed adjacent to the circular central opening 70, the inner edge 78 of which ring portion 72 corresponds to the outer boundary of central opening 70 in the depicted embodiment.

In such depicted embodiment, spreader bat disk 40 is positionable to rest upon the outwardly directed flanges 52 of spreader cone 42 such that the central opening 70 of spreader bat disk 40 and the base 48 of spreader cone 42 are generally co-extensive and aligned. Web portion 56 of spreader bat disk 40 also includes mounting holes 80 adjacent the central opening 70 alignable with the mounting holes 54 through the outwardly directed flanges 52 of spreader cone 42 to securably attach spreader bat disk 40 to spreader cone 42, such as by nuts 82A and bolts 82B or any other suitable connectors.

A plurality of integral blade or fin-type projections 84 extend upwardly from the top surface 58 of the web portion 56 and longitudinally from an inner end 86 at inner ring portion 76 near the central opening 70 through the spreader bat disk 38 to an outer end 88 at the outer portion 70 near the outer periphery 62 of the spreader bat disk 38 to form spreader blades for throwing the crop residue.

Conical axle linkage 50 includes a lower end portion 92, including a depending shaft 94, with a cross bore 96 therethrough that is connectable to the upper end 46 of spreader cone 44, such as by a nut 48A and bolt 48B or other suitable connector. The upper end 98 of conical axle linkage 50 includes a plunged hexagonal cavity 100 therein sized to receive a drive linkage shaft and having an associated locking assembly 102, such as a biased button locking mechanism of known construction, for locking conical axle linkage 50 to such a drive linkage shaft, with an optional collar 104 surrounding the upper portion of shaft 94 below the lock assembly 102.

As best shown in FIG. 2, the conical axle linkages 50 for the side-by-side spreader head assemblies 38A and 38B are fixedly attached to generally vertical hexagonal drive linkage shafts 110A and 110B. A generally horizontally mounted hexagonal drive shaft 112 is rotatable by a drive mechanism 114, shown in block form and being of known construction, of the combine 20 such that, when drive mechanism 114 is operated in its normal forward mode of operation, the upper surface of the drive shaft 112, as viewed in FIG. 2, moves into the page while the lower surface moves out of the page, as illustrated by arrow A. The horizontal hexagonal drive shaft 112 is rotatably supported by bearings 116, 118, and 120, which are respectively supported by the outer wall 122 of the combine 20, by a left axle support bracket assembly 124A, and by a right axle support bracket assembly 124B.

The left drive linkage axle shaft 110A and the right drive axle linkage shaft 110B are similarly rotatably supported by bearings 128, 130, 132, and 134, which are also supported by the left axle support bracket assembly 124A and by the right axle support bracket assembly 124B. Fixedly and axially mounted upon the upper ends of the left drive linkage axle shaft 110A and upon the right drive linkage axle shaft 110B are left and right upward facing bevel gears 140A and 140B, the left upward facing bevel gear 140A engaging with a leftward facing bevel gear 142A mounted upon the drive shaft 112, and the right upward facing bevel gear 140B engaging with a rightward facing bevel gear 142B also mounted upon the horizontal drive shaft 112. Upon rotation of the horizontal drive shaft 112 in the manner described above, the leftward facing and rightward facing bevel gears 142A and 142B counter-rotate the left and right upward facing bevel gears 140A and 140B, which rotate the left axle 110A and the right axle 110B, rotating the left and right spreader head assemblies 38A and 38B.

As better envisioned with reference to FIGS. 2 and 3, during a harvesting operation crop residue is directed to discharge chute 32 where it flows rearwardly along an angled floor 150, and a triangular floor extension plate 152 that prevents the crop residue from falling downward to the ground between the spreader head assemblies 38A and 38B, towards the counter-rotating left and right spreader head assemblies 38A and 38B. The spreader bat disks 40 of such spreader head assemblies thus counter-rotate relative to one another, with the left spreader bat disk rotating in a clockwise direction and the right spreader bat disk rotating in a counter-clockwise direction, as indicated by arrows C in FIG. 2. As the crop residue falls onto the top surface of web portion 56 of the spreader bat disks 40, the integral spreader blades 84 contact the crop residue and propel it rearwardly and somewhat sidewardly behind the combine 20.

Figure 6:
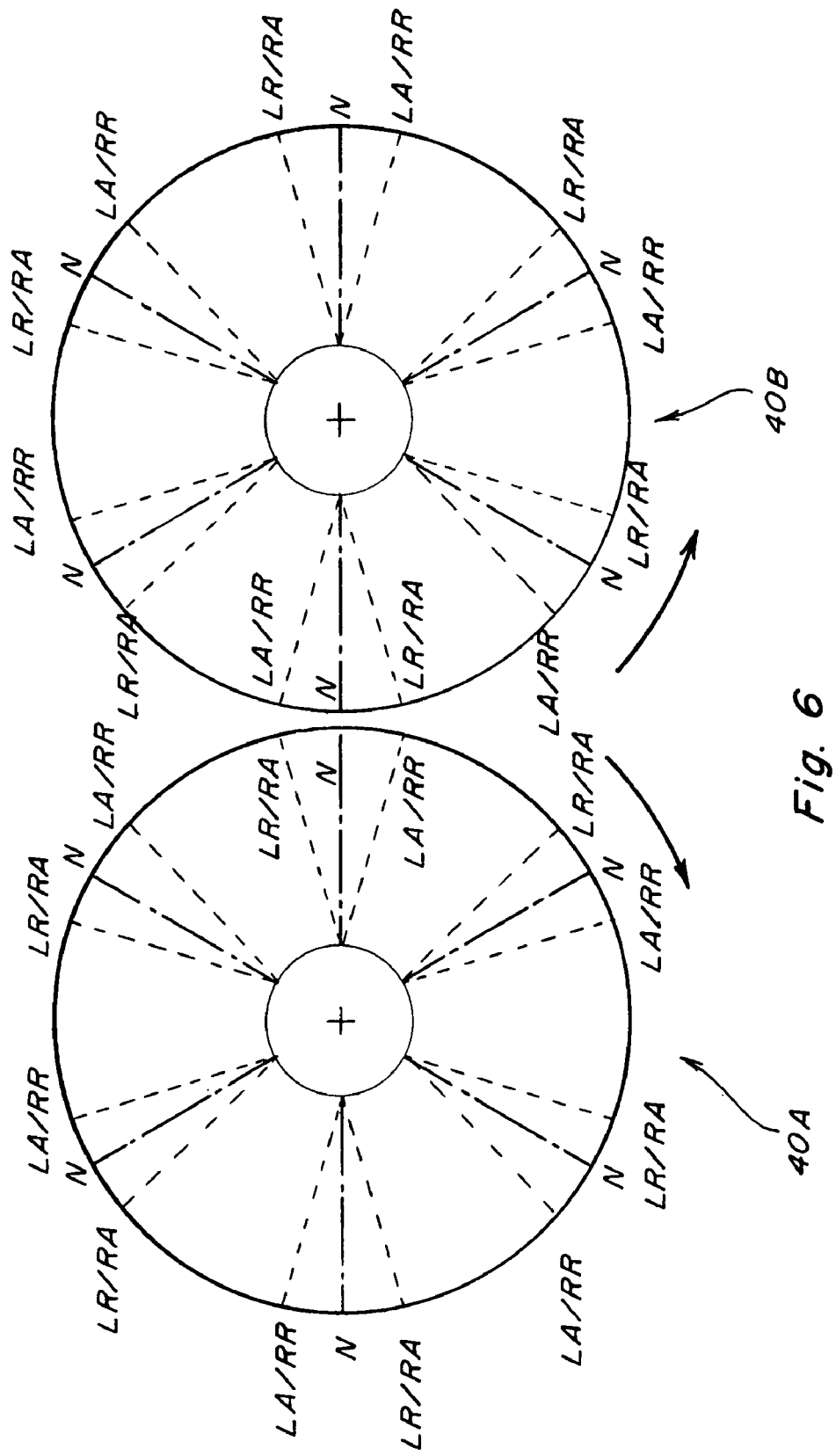
FIG. 6 is a top representational view of a pair of bat disks illustrating nominal, aggressive, and retarded positionings for integral spreader blades.

The noted integral spreader blades 84 may be disposed at spaced radial intervals on said spreader bat disk 40 to extend from the inner end 86 to the outer end 88 thereof, generally either along a radial or at some offset to a radial, as is illustrated by FIG. 6 which represents a pair of spreader bat disks with spreader bat disk 40A mounted on the left for clockwise rotation and spreader bat disk 40B mounted on the right for counter-clockwise rotation. If the integral spreader blades 84 for the pair of spreader bat disks are all disposed along blade base radials, such as along radials denoted by the designations N, for nominal, the spreader bat disks 40A and 40B will be essentially identical to one another.

Alternatively, however, the integral spreader blades 84 may be positioned at other locations, such as, for example, locations designated in FIG. 6 as LA/RR, denoting "left aggressive/right retarded", or LR/RA, denoting "left retarded/right aggressive". By employing a pair of spreader bat disks wherein the left, clockwise rotating spreader bat disk 40A has integral spreader blades 84 positioned at LA/RR positions and the right counter-clockwise rotating spreader bat disk 40B has integral spreader blades 84 positioned at LR/RA positions, a user can generally, with such aggressive throw configuration, effect a greater sidewardly distribution of crop residue across the cut swath. On the other hand, by employing a pair of spreader bat disks where the left, clockwise rotating spreader bat disk 40A has integral spreader blades 84 positioned at LR/RA positions and the right counter-clockwise rotating spreader bat disk 40B has integral spreader blades 84 positioned at LA/RR positions, a user can generally, with such retarded throw configuration, effect a less sidewardly distribution of crop residue across the cut swath.

In the particular embodiment of FIGS. 1-4, the spreader bat disks 40 depicted therein, though highly similar to one another in many respects, differ somewhat from one another in that, in order to achieve an aggressive throw operation, the left spreader bat disk has integral spreader blades positioned generally at LA/RR positions while the right spreader bat disk has integral spreader blades positioned generally at LR/RA positions. Such preferred configuration and mounting is more clearly observable from FIG. 7, which is a sectional view taken generally along cut 7-7 of FIG. 2 and wherein the left spreader bat disk, with integral spreader blades positioned generally at LA/RR positions, is designated as spreader bat disk 40A and wherein the right spreader bat disk, with integral spreader blades positioned generally at LR/RA positions, is designated as spreader bat disk 40B.

Figure 7:
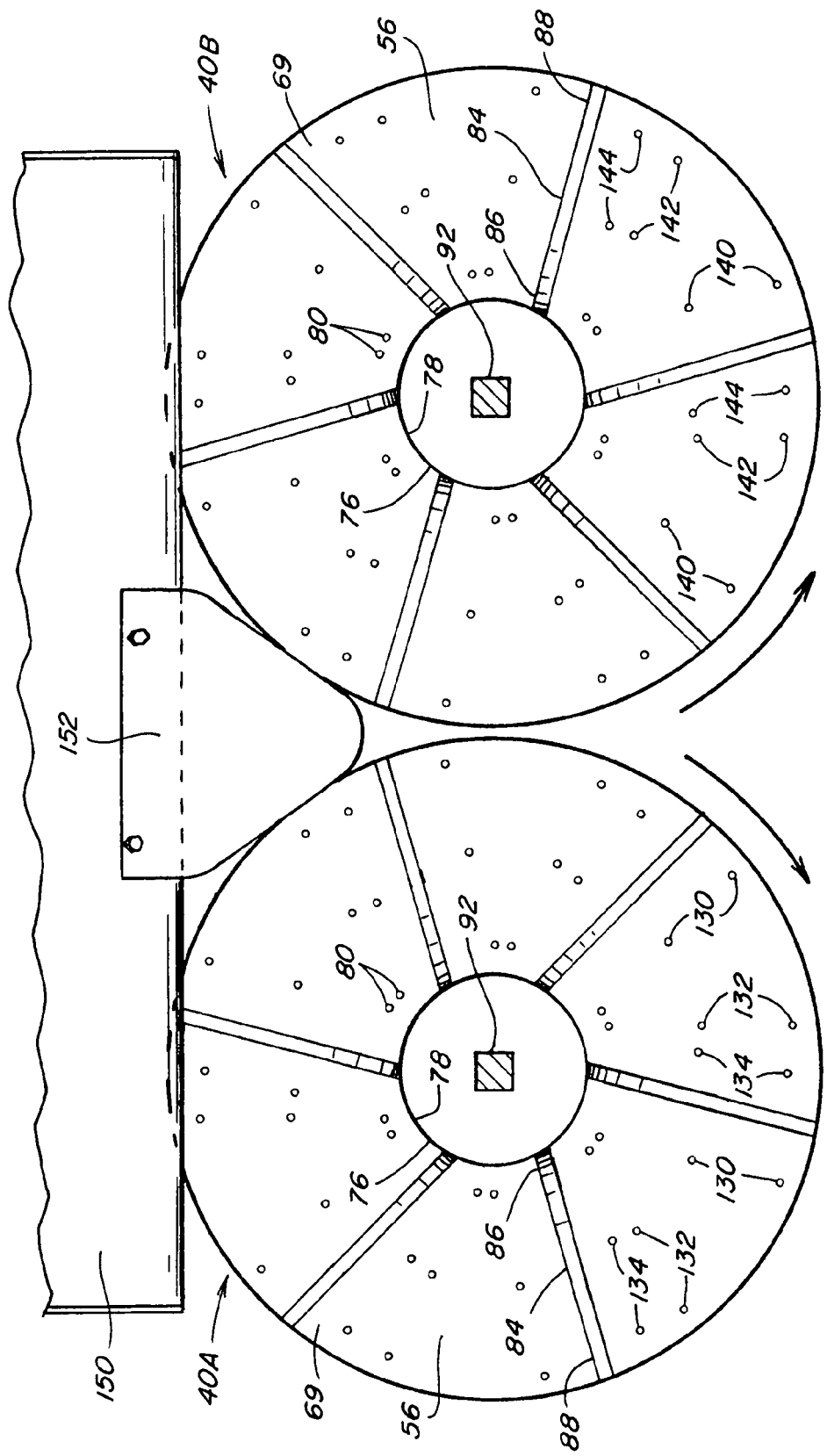
FIG. 7 is a top view of a preferred form of the spreader bat disks of FIG. 2 taken along cut 7-7 of FIG. 2.
Figure 8:
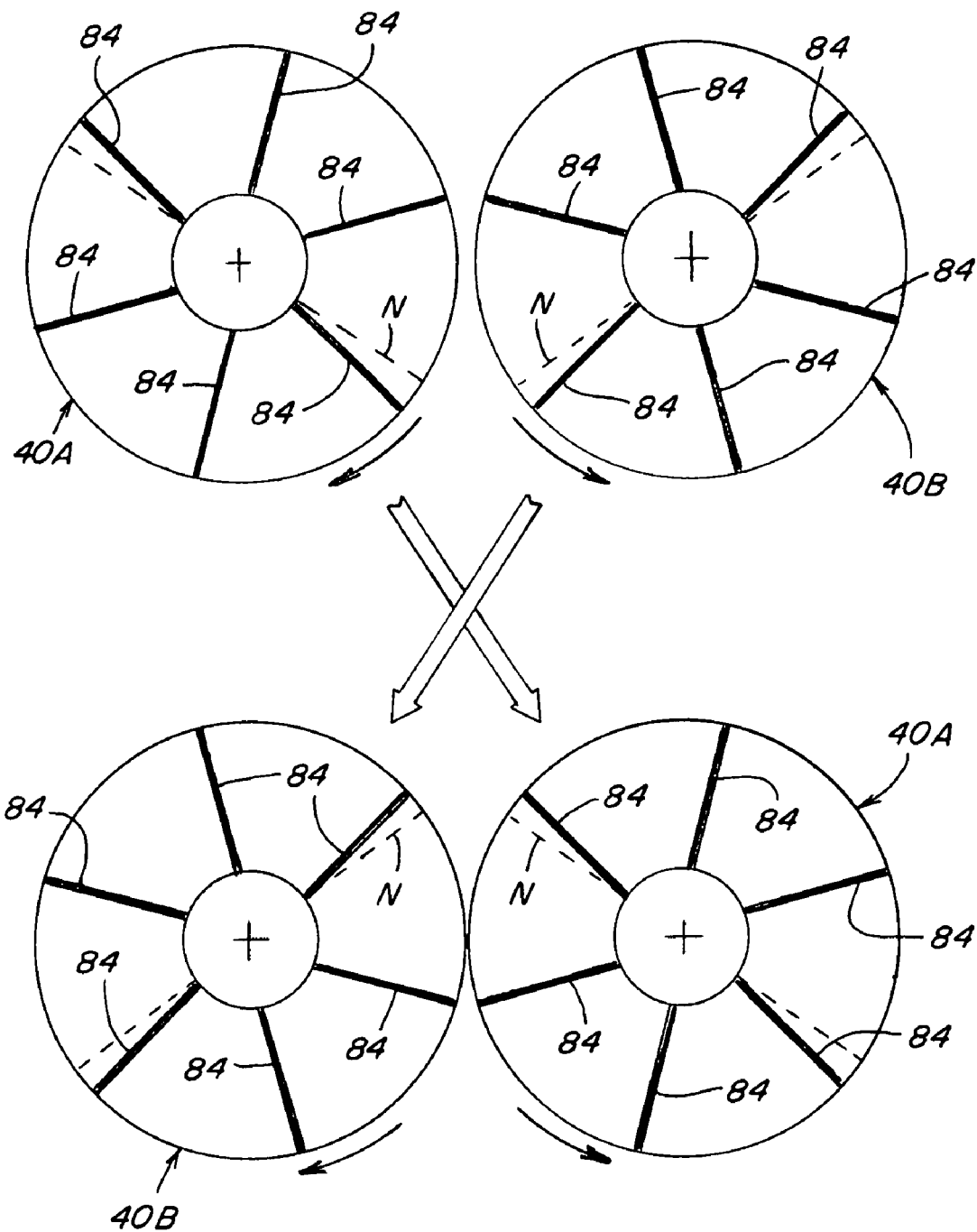
FIG. 8 is a top representational view illustrating how a pair of counter-rotating spreader bat disks having spreader blades formed thereon with particular throw positionings can be reversibly mounted between left and right mountings to effect aggressive throw operation in one mounting configuration and retarded throw operation by reversing the left and right mountings of the spreader bat disks.

FIG. 8 illustrates how the left and right mountings of the spreader bat disks 40A and 40B of FIG. 7 may be readily reversed to effect a change from aggressive throw operation to retarded throw operation, illustrating how the integral spreader blades 84 are positioned relative to a nominal radial N to either be advanced or retarded relative thereto for the different left and right positionings. In such regard, the upper portion of FIG. 8 depicts spreader bat disk 40A mounted as the left spreader bat disk with spreader bat disk 40B mounted as the right spreader bat, and the lower portion of FIG. 8 depicts the resulting configuration when the left and right positions of the spreader bat disks 40A and 40B are reversed.

Figure 9:
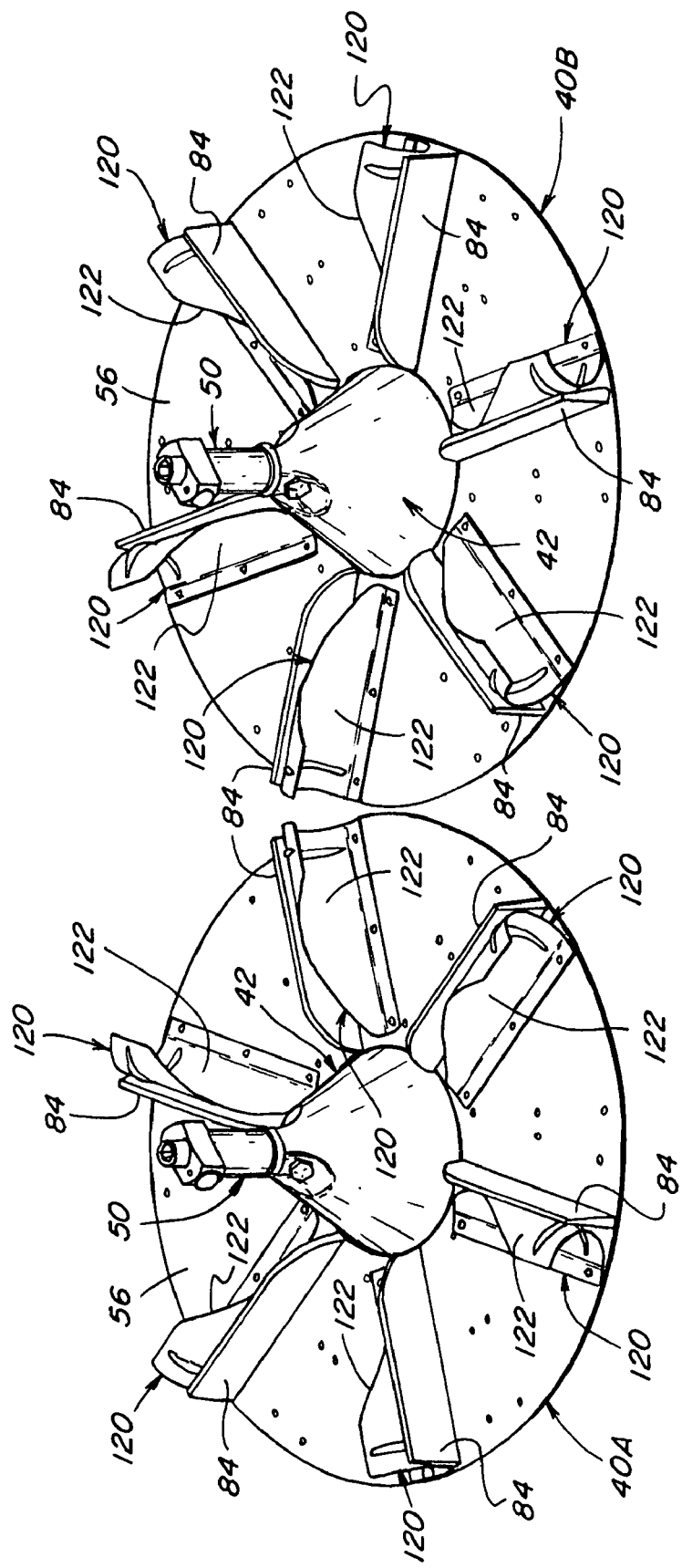
FIG. 9 is a perspective view of a pair of spreader bat disks, similar to FIG. 4, with optional additional spreader bats installed.

Optionally, additional separately installable spreader bats can also be employed with the spreader bat disks 40A and 40B. The spreader bat disks 40A and 40B may include mounting holes at various locations, such as the mounting hole pairs 130, 132, 134 in the web portion 64 of spreader bat disk 40A and mounting hole pairs 140, 142, and 144 in the web portion 56 of spreader bat disk 40B depicted in FIG. 7. The additional spreader bats, which may be of various configurations, can be securably attached to the spreader bat disks, such as by attaching them to the spreader bat disks at the locations of various mounting holes in either the web portion or along the integral spreader blades. Preferably, the additional spreader bats will include a plurality of separate spreader bats, such as, by way of example, the spreader bats 120 depicted in FIGS. 9-10, each of which includes a concave blade portion 122 extending along the length of the spreader bat 120 and facing the direction of rotation. The spreader bats 120 can be installed generally adjacent the integral spreader blades 84 on the spreader bat disks 40A and 40B, such as at mounting holes 130 (FIG. 7) of spreader bat disk 40A and mounting holes 140 of spreader bat disk 40B for aggressive throw positioning, especially for lighter residue crops. Additional mounting holes in the spreader bat disk can also accommodate the installation of the additional spreader bats at middle or neutral positions between the integral spreader blades.

Figure 10:
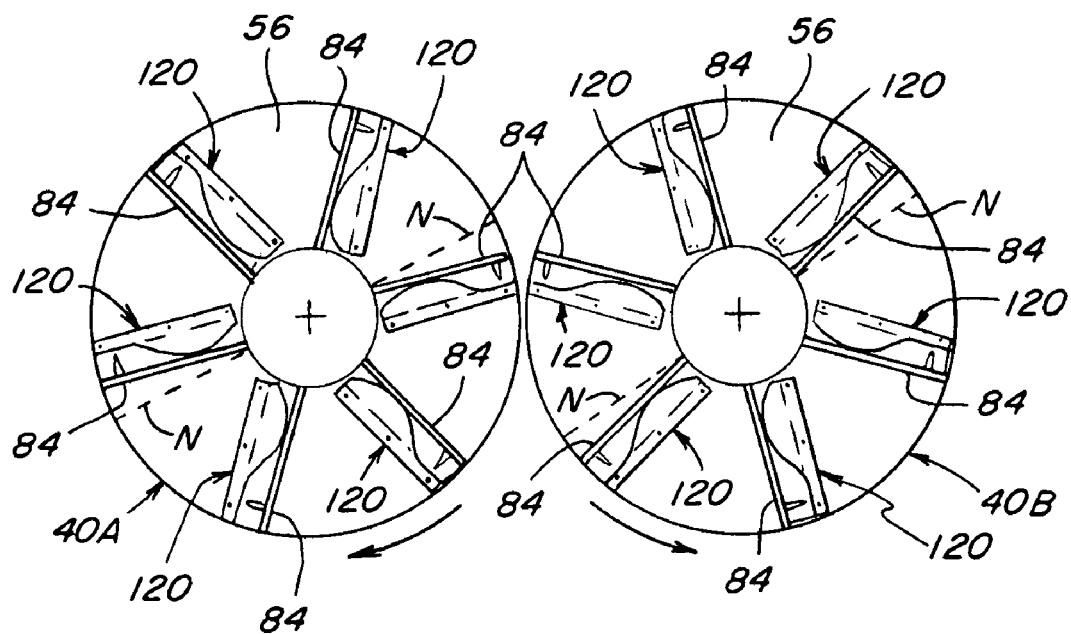
FIGS. 10 and 11 are views similar in some respects to those different spreader bat disk mountings illustrated in FIG. 8, illustrating how the optional additional spreader bats of FIG. 9 are re-mounted on the spreader bat disks when the left and right positionings of the spreader bat disks are reversed.
Figure 11:
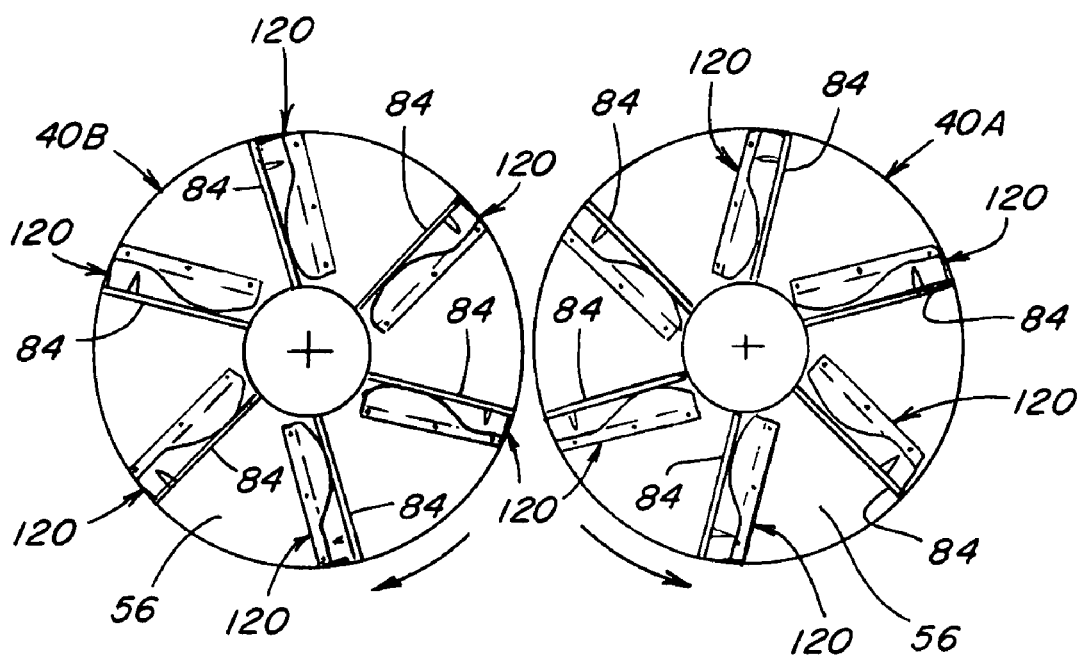

In the event that a user desires to reverse the left and right mountings of the spreader bat disks 40A and 40B of FIG. 10 in order to effect a retarded throw operation instead of an aggressive throw operation, the separate bats 120 may be removed from the mountings at mounting holes 130 (FIG. 7) on one side of a spreader blade 84 on spreader bat disk 40A and mounting holes 140 on one side of a spreader blade 84 on spreader bat disk 40B, re-oriented to face the opposite direction, and re-mounted on the opposite sides of such integral spreader blades 84, at mounting holes 134 of the reverse mounted spreader bat disk 40A and at mounting holes 144 of the reverse mounted spreader bat disk 40B, to result in the retarded throw configuration as depicted in FIG. 11.

Figure 12:
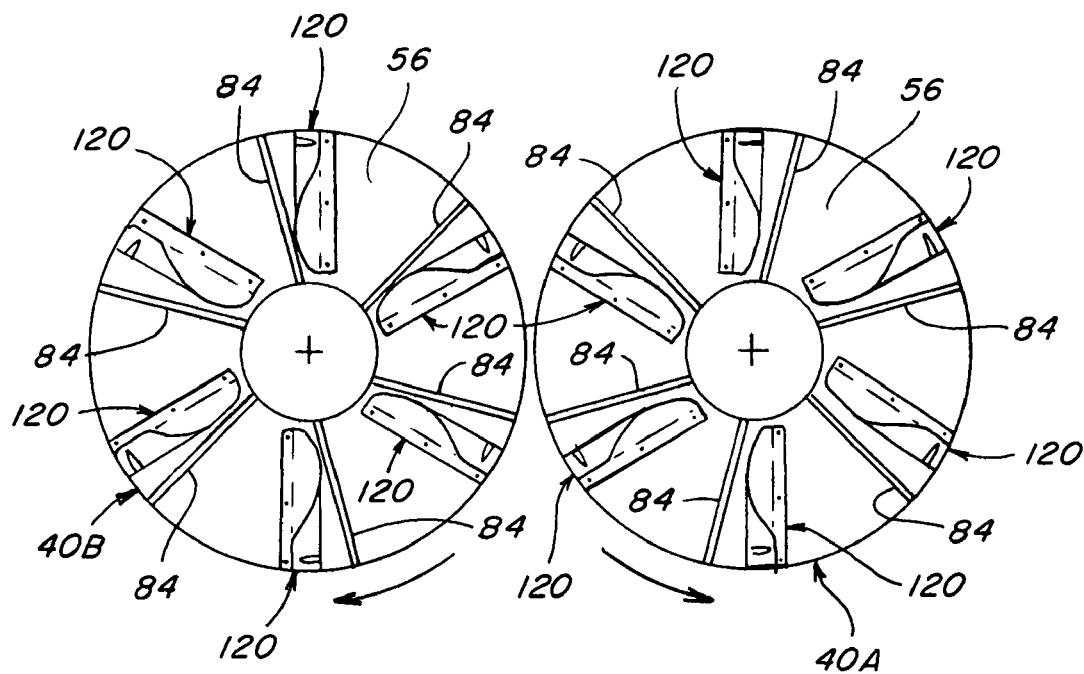
FIG. 12 is a view similar to FIG. 11, but showing an alternate, intermediate positioning of the additional spreader bats.

By re-mounting the additional spreader bats 120 at mounting holes 132 (FIG. 7) of reverse mounted spreader bat disk 40A and mounting holes 142 of reverse mounted spreader bat disk 40B, instead of at mounting holes 134 of the reverse mounted spreader bat disk 40A and at mounting holes 144 of the reverse mounted spreader bat disk 40B, a variation of the retarded throw configuration, as depicted in FIG. 12, can be realized.

Figure 13:
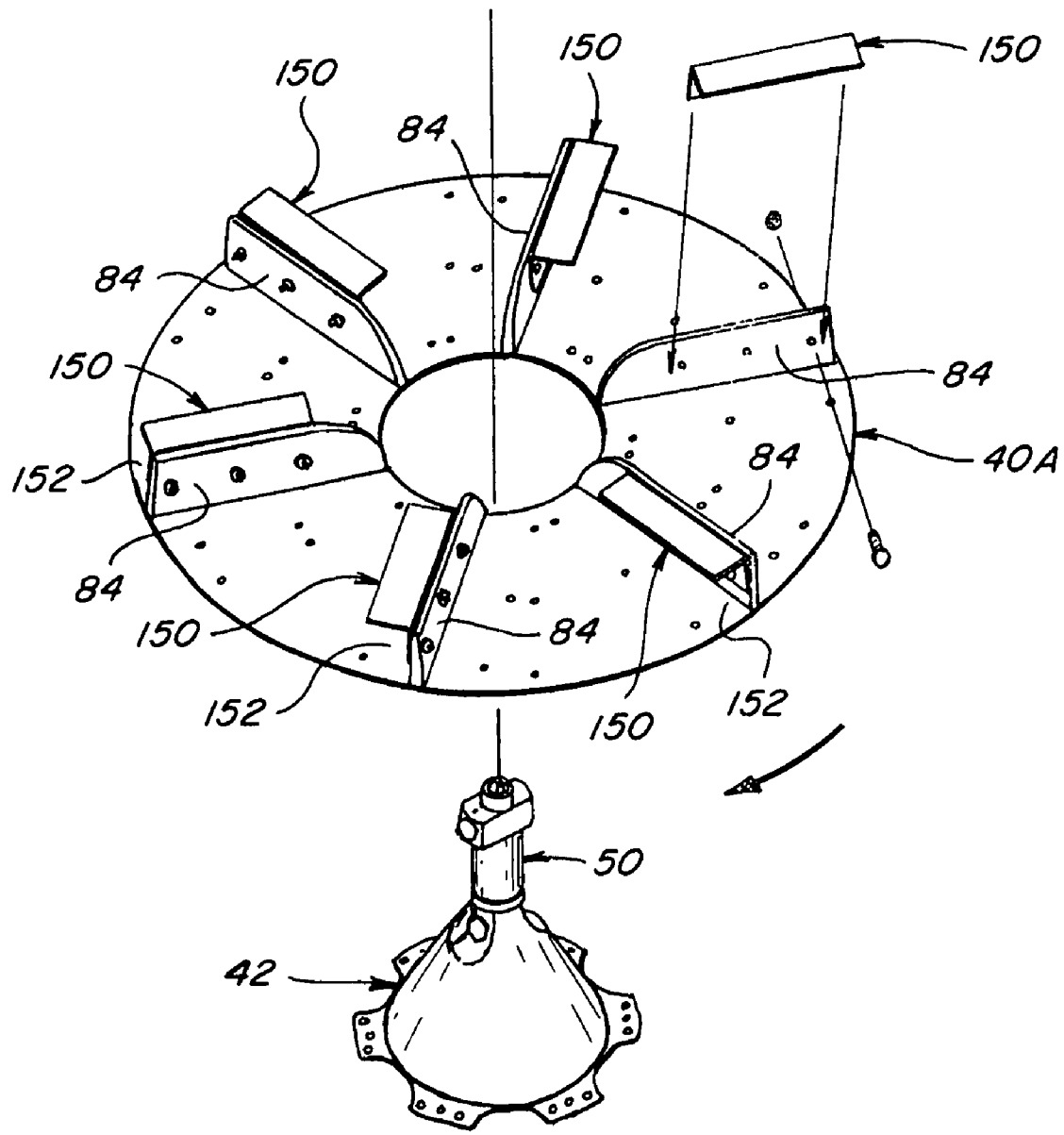
FIG. 13 is a partially exploded perspective view of a spreader bat disk and spreader cone head assembly illustrating the use of alternative additional spreader bats that are attachable to the integral spreader blades.

Additional spreader bats of other configurations may also be employed, including, for example, bats of a generally inverted L-shape, such as the spreader bats 150 depicted in FIG. 13. Such spreader bats 150 can be attached to the integral spreader blades 84 so that the web portion 56, the integral spreader blade 84 to which the additional inverted L-shaped bat 150 is attached, and such inverted L-shaped bat 150 define a scoop or trough 152 along the top surface 58 of the web portion 56 in the direction of rotation of the spreader bat disk. As the spreader bat disk is rotated, crop residue falling onto the top surface 58 of the web portion is swept towards and in some cases into the troughs 152 and is flung outwardly therefrom by centrifugal force as the rotation of the spreader disk continues.

Figure 14:
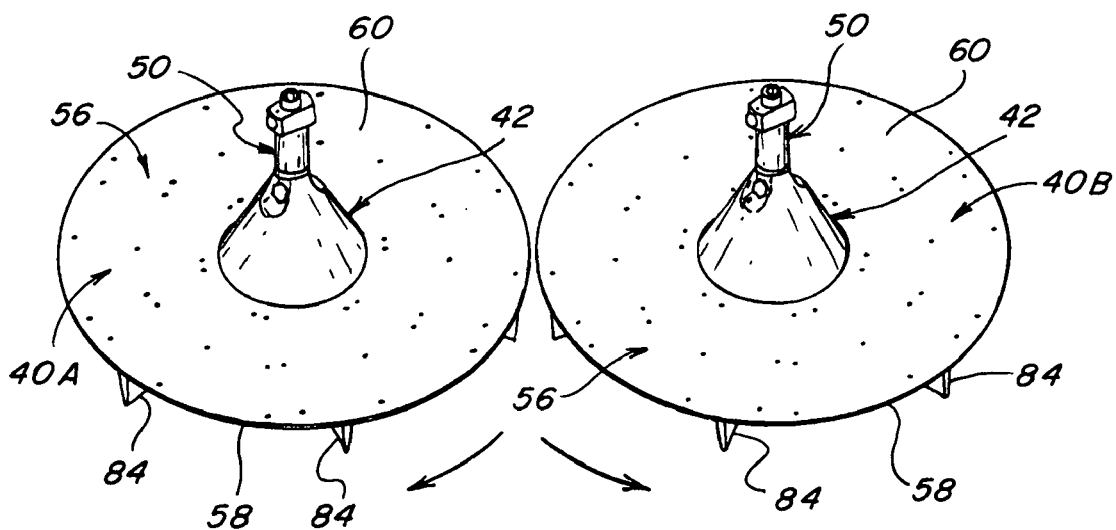
FIG. 14 is a perspective view of a pair of spreader bat disks illustrating how they may be utilized upside down for windrowing.

Spreader bat disks such as have been described hereinabove can also be employed during windrowing operations, especially when the bottom surface 60 of the web portion 56 is essentially flat, to facilitate the rearward flow and distribution of the crop residue behind the combine without undesired spreading across the swath of the crop cut. This is readily accomplished with spreader bat disks such as spreader bat disks 40A and 40B by installing the spreader bat disks upside down relative to the spreader cones 42, as is depicted in FIG. 14. In such instances, the top surfaces 58 of the web portions 56 of the spreader bat disks 40A and 40B, along with the integral spreader blades 84 projecting therefrom, will face downwardly, towards the ground surface, and the generally flat and smooth bottom surfaces 60 of the spreader bat disks 40A and 40B will face upwardly towards the crop residue output port and the crop residue being discharged therefrom. The counter-rotating action of the spreader bat disks 40A and 40B, when so installed upside down, will tend, due to the relatively smooth bottom surfaces of the spreader bat disks and the lack of spreader bats thereon, to propel the crop residue rearwardly with minimal sidewardly distribution.

It is also envisioned that, to attain further parts costs savings, a spreader cone portion of similar configuration to spreader cone 42, but without any necessity for a flange portion 51 or flanges 52, could be incorporated into the unitary member as an integral part thereof such that the resulting unitary spreader cone disk would then include the various features of the spreader bat disk 40 as well as an integral spreader cone portion connectable to the conical axle linkage 50. Still further cost savings could be realized by also incorporating the conical axle linkage 50, except for any installable push button locking mechanism 102 or other attachment mechanism as might be required, into the unitary member as an integral part thereof to form an integral spreader head.

The material utilized for the unitary member should be a material that, when suitably molded or formed, is wear and abrasion resistant, is able to maintain a consistent shape that retains a generally flat web portion with integral projecting blades, can withstand normal operating conditions of approximately −30° F. to +120° F., and has suitable electrical conductivity and anti-static properties for and during anticipated uses. Taking into account the costs of various materials as well as the costs of forming the unitary member, it is presently preferred that the material utilized be a glass reinforced polypropylene that is injection molded, although, as previously noted, the unitary member could also be formed from other moldable or castable materials, including fiberglass, metals and metal alloys, ceramics, carbon fiber materials, or other suitable materials, or may be cut or otherwise formed from a block or quantity of homogeneous material.

It should be appreciated that the present invention has been described primarily with reference to the preferred embodiments discussed hereinabove, in which embodiments the web portion thereof has been described as being generally circular and having a generally circular central opening, and for use with a spreader cone and conical linkage assembly. It should be understood, however, that the web portion need not be circular in shape nor need it have a central opening therethrough, much less a circular central opening. Similarly, the linkage assembly to which the unitary member of the invention is operatively connected need not include a spreader cone or conical linkage assembly. Web portions of other shapes, with or without central openings, may be readily employed and may be configured to be operatively connectable to drive linkages of various designs that are operable to rotatably drive attachments thereto.

Furthermore, although the integral spreader blades of the preferred embodiments have been depicted as being generally straight, they may also be curved, bent, or segmented along both their lengths and heights, and need not extend the full distance between the central opening of the web portion and the outer periphery thereof and need not be spaced uniformly about the top surface of the web portion. Many possible forms may be utilized without departing from the spirit and scope of the invention.

Additionally, although the invention has been described and discussed hereinabove with reference to a harvester combine and its operation, including operation in a spreader assembly that typically utilizes a pair of counter-rotating spreader disk assemblies disposed in a side-by-side generally horizontal relationship for rotation about respective, generally vertical axes of rotation for spreading crop residue, the unitary spreader bat disks may also find varied beneficial applications with other spreading constructions and for purposes other than the spreading of crop residue without departing from the spirit and scope of the invention.

In light of all the foregoing, it should thus be apparent to those skilled in the art that there has been shown and described herein a construction formed or molded as a unitary member that can replace or be employed in lieu of at least a number of the sundry separate components that were previously required to assemble and use a spreader disk assembly in a spreader assembly. However, it should also be apparent that, within the principles and scope of the invention, many changes are possible and contemplated, including in the details, materials, and arrangements of parts and elements which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A spreader bat disk for a spreader assembly for spreading material provided thereto, the spreader assembly including a drive linkage operable to rotatably drive attachments thereto, the spreader bat disk comprising a unitary member including a generally flat web portion having top and bottom surface portions, a generally perpendicular rotation axis through approximately the center of said web portion, an outer periphery the outermost portions of which generally define a spreader disk circle when said web portion is rotated about said rotation axis, an outer portion generally inwardly adjacent said outer periphery, and an inner ring portion spaced inwardly from said outer portion and generally concentric with said spreader disk circle and having a diameter smaller than the diameter of said spreader disk circle, said top surface portion of said web portion including a plurality of generally radially spaced upwardly projecting blade elements extending outwardly on said top surface of said web portion from said inner ring portion of said web portion towards said outer portion of said web portion, said inner ring portion and said outer periphery of said web portion being generally concentrically disposed relative to the rotation axis, said web portion, being operatively connectable to the drive linkage of the spreader assembly to be rotatable about the rotation axis, said blade elements of such an operatively connected unitary member operable to engage material provided onto said top surface of said web portion for spreading and to centrifugally throw such material as said unitary member is rotated about the rotation axis, and at least one detachable concave blade mountable to the top surface of the web portion on either side of a blade element, wherein the concave blade is generally adjacent to the blade element on either the left or right side depending on the mounting configuration of the disk for either aggressive or retarded throw positioning.

2. The spreader bat disk of claim 1 wherein said blade elements are spaced generally uniformly from one another.

3. The spreader bat disk of claim 1 wherein said blade elements have an inner end and an outer end and are skewed relative to a radial of the spreader disk circle that passes through said inner end of said blade element, such radial defining a blade base radial.

4. The spreader bat disk of claim 3 wherein said outer ends of said blade elements are advanced forwardly, in the direction of rotation of said unitary member about the rotation axis, from the blade base radial.

5. The spreader bat disk of claim 3 wherein said outer ends of said blade elements are positioned rearwardly, in the direction of rotation of said unitary member about the rotation axis, from the blade base radial.

6. The spreader bat disk of claim 3 wherein said blade elements extend generally radially towards said outer periphery of said web portion from said inner ends to said outer ends.

7. The spreader bat disk of claim 3 wherein said bottom surface of said web portion is essentially flat and devoid of projections.

8. The spreader bat disk of claim 7 wherein said web portion of said unitary member is reversibly positionable with said top surface of said web portion facing downwardly and with said essentially flat bottom surface facing upwardly and, when so reversibly positioned, being operatively connectable to the drive linkage of the spreader assembly to rotate said unitary member about the rotation axis.

9. The spreader bat disk of claim 1 wherein said unitary member is formed from an essentially homogeneous material.

10. The spreader bat disk of claim 9 wherein said unitary member is a molded plastic.

11. The spreader bat disk of claim 9 wherein said unitary member is a metallic casting.

12. The spreader bat disk of claim 9 wherein said unitary member is a die cut body.

13. The spreader bat disk of claim 1 further including at least one separate bat element and a bat element mounting connector therefor, and wherein said unitary member includes at least one mounting location for said separate bat element, said separate bat element mountable to said spreader bat disk at said mounting location by said mounting connector.

14. The spreader bat disk of claim 13 wherein said separate bat element includes a longitudinal element with an inner end positionable closer to said inner ring portion of said web portion and an outer end closer to said outer portion of said web portion.

15. The spreader bat disk of claim 14 wherein said longitudinal element includes a leading side positionable to face the direction of rotation of said unitary member, said leading side having a concave surface extending longitudinally along at least a portion thereof.

16. The spreader bat disk of claim 15 wherein said separate bat element and said web portion include alignable holes therethrough and wherein said mounting connector includes a bolt member insertable through said alignable holes when aligned.

17. The spreader bat disk of claim 16 wherein said alignable holes in said web portion are radially intermediate a pair of blade elements of said unitary member.

18. The spreader bat disk of claim 15 wherein said separate bat element is skewed relative to a radial of the spreader disk circle that passes through said inner end of said bat element.

19. The spreader bat disk of claim 14 wherein said mounting location for said separate bat element is located along one of the blade elements of said unitary member.

20. The spreader bat disk of claim 19 wherein said separate bat element includes a leading side positionable to face the direction of rotation of said unitary member, said leading side having a generally inverted L-shape extending longitudinally along at least a portion thereof.

21. The spreader bat disk of claim 19 wherein said separate bat element is configured, when mounted to a blade element of said web portion, to define a material trough with an open side in the direction of rotation of the unitary member along at least a portion of said blade element.

22. The spreader bat disk of claim 13 including a plurality of separate bat elements, each having an associated mounting connector therefor, and wherein said unitary member includes a plurality of mounting locations for said plurality of separate bat elements.

23. The spreader bat disk of claim 22 wherein said separate bat elements have an inner end positionable closer to said inner ring portion of said web portion and an outer end positionable closer to said outer portion of said web portion and are mountable at mounting locations to skew said outer ends thereof relative to radials of the spreader disk that pass through said inner ends of said bat elements.

24. The spreader bat disk of claim 1 wherein the drive linkage of the spreader assembly includes a lower outwardly extending flange portion and said web portion of said unitary member is attachable to the flange portion.

25. The spreader bat disk of claim 24 wherein the flange portion the drive linkage includes a plurality of radially spaced flanges and wherein said web portion includes a central opening therethrough, said inner ring portion of said web portion being outwardly adjacent to said central opening through said web portion, said inner ring portion connectable to the radially spaced flanges.

26. The spreader bat disk of claim 25 wherein the drive linkage of the spreader assembly includes a spreader cone having an upper end and a cone base, the flange portion disposed about the cone base, said central opening through said web portion having a planar shape approximately the same as the planar shape of the cone base.

27. The spreader bat disk of claim 26 wherein the cone base and said central opening through said web portion are approximately circular and the diameters thereof are approximately the same and smaller than the diameter of said spreader disk circle.

28. The spreader bat disk of claim 1 wherein said outer periphery is generally circular and said web portion includes a generally circular opening therethrough.

29. The spreader bat disk of claim 1 further including a spreader cone incorporated into said unitary member to define a spreader cone disk, said spreader cone projecting upwardly from said top surface of said web portion inwardly adjacent to said inner ring portion and about the rotation axis of said web portion.

30. The spreader bat disk of claim 29 wherein the drive linkage of the spreader assembly includes a drive linkage shaft and the spreader bat disk further includes a conical linkage portion incorporated into said unitary member to define an integral spreader head, said spreader cone including an upper end, said conical linkage portion extending upwardly from said upper end of said spreader cone and including a plunge cavity therein extending downwardly from the top thereof for receiving therein the drive linkage shaft of the drive assembly.

31. A spreader bat disk for a spreader assembly for spreading material provided thereto, the spreader assembly having a drivable spreader head assembly that includes a spreader head connector having a spreader head connector top and a spreader head connector base, the spreader head connector top connectable to a linkage assembly for rotatably driving said spreader head connector about a rotation axis extending generally through the spreader head connector top and the center of the spreader head connector base, the outermost portion of the spreader head connector base defining a spreader head circle having an outer circumference when the spreader head connector is rotated about the rotation axis, the spreader bat disk comprising a unitary member including a web portion having top and bottom surface portions and a generally circular outer periphery generally defining a spreader disk circle having a diameter greater than the diameter of the spreader head circle, said web portion of said unitary member positionable adjacent to the base of the spreader head connector with said top surface of said web portion facing upwardly and with the outer circumference of the spreader head circle and said outer periphery of said web portion being generally concentrically disposed relative to the rotation axis, said web portion, when so positioned, being mountable to the spreader head to define a spreader bat positioning area on said web portion between the outer circumference of the spreader head circle and said outer periphery of said web portion, said bat positioning area having an inner portion generally outwardly adjacent to the outer circumference of the spreader cone base and an outer portion generally inwardly adjacent to said outer periphery of said web portion, said top surface portion of said web portion including a plurality of generally radially spaced upwardly projecting integral blade elements disposed on said spreader bat positioning area and extending outwardly from said inner portion of said web portion towards said outer portion of said web portion, said unitary member being rotatable with the spreader head when mated thereto to rotate said unitary member about the rotation axis, said blade elements of said unitary member operable to engage material provided onto said top surface of said web portion for spreading and to centrifugally throw such material as said unitary member is rotated about the rotation axis, and at least one detachable concave blade mountable to the top surface of the web portion on either side of a blade element, wherein the concave blade is generally adjacent to the blade element on either the left or right side depending on the mounting configuration of the disk for either aggressive or retarded throw positioning.

32. A spreader bat disk for a spreader assembly having a drivable spreader cone assembly that includes a spreader cone having a spreader cone top and a spreader cone base, the spreader cone base being generally circular with an outer circumference, the spreader cone top connectable to a conical linkage assembly for rotatably driving said spreader cone about a rotation axis extending generally through the spreader cone top and the center of the spreader cone base, the spreader bat disk comprising a unitary member including a web portion having a generally circular outer periphery generally defining a spreader disk circle having a diameter greater than the diameter of the base of the spreader cone, said web portion of said unitary member positionable adjacent to the base of the spreader cone with the outer circumference of the spreader cone base and said outer periphery of said web portion being generally concentrically disposed relative to the rotation axis, said web portion matable to the spreader cone to define a spreader bat positioning area on said top surface of said web portion between the outer circumference of the spreader cone base and said outer periphery of said web portion, said web portion having an inner ring portion generally outwardly adjacent to the outer circumference of the spreader cone base and an outer portion generally inwardly adjacent to said outer periphery of said web portion, said web portion including top and bottom surface portions, said top surface portion of said web portion including a plurality of generally radially spaced upwardly projecting blade elements disposed on said spreader bat positioning area and extending outwardly from said inner portion of said web portion towards said outer portion of said web portion, said unitary member being rotatable with the spreader cone when mated thereto to rotate said member about the rotation axis, and at least one detachable concave blade mountable to the top surface of the web portion on either side of a blade element, wherein the concave blade is generally adjacent to the blade element on either the left or right side depending on the mounting configuration of the disk for either aggressive or retarded throw positioning.

* * * * *